United States Patent
Eslambolchi et al.

[19]
[11] Patent Number: 6,141,878
[45] Date of Patent: Nov. 7, 2000

[54] ENCAPSULANT CUTTING TOOL FOR FIBER OPTIC CABLES

[75] Inventors: Hossein Eslambolchi, Basking Ridge, N.J.; John Sinclair Huffman, Conyers, Ga.

[73] Assignee: AT&T Corp, New York, N.Y.

[21] Appl. No.: 09/303,971

[22] Filed: May 3, 1999

[51] Int. Cl.$^7$ .................................................. B26B 15/00
[52] U.S. Cl. ................................ 30/216; 30/228; 30/247
[58] Field of Search ............................ 30/208, 209, 210, 30/215, 216, 228, 244, 245, 247

[56] References Cited

U.S. PATENT DOCUMENTS

| | | | |
|---|---|---|---|
| 2,020,567 | 11/1935 | Noske | 30/247 |
| 2,490,096 | 12/1949 | Page | 30/228 |
| 2,565,878 | 8/1951 | O'Neilly | 30/216 |
| 2,630,628 | 3/1953 | Hall | 30/216 |
| 2,927,373 | 3/1960 | Taube | 30/247 |
| 2,979,820 | 4/1961 | Thompson | 30/215 |
| 3,683,497 | 8/1972 | Duffy et al. | 30/228 |
| 3,774,302 | 11/1973 | Ketchpel, Jr. et al. | 30/216 |
| 3,958,331 | 5/1976 | Klebe, Jr. | 30/216 |

FOREIGN PATENT DOCUMENTS

| 203615 | 9/1923 | United Kingdom | 30/215 |
|---|---|---|---|

*Primary Examiner*—Hwei-Siu Payer

[57] ABSTRACT

A hand-held cutting tool for removing encapsulant surrounding a fiber optic cable splice includes a pair of saw-tooth edged scissor blades, coupled through a gear and drive shaft to a motor included within the tool. When activated, the gear functions to move the pair of blades back and forth, resulting in a scissor motion of the blades sufficient to cut through and remove encapsulant surrounding an fiber optic cable.

4 Claims, 2 Drawing Sheets

ENCAPSULANT CUTTING TOOL FOR FIBER OPTIC CABLES

TECHNICAL FIELD

The present invention relates to a tool and method for removing the encapsulant surrounding a fiber optic cable and, more particularly, to a hand-held cutting tool including a pair of scissor blades for cutting away the encapsulant.

BACKGROUND OF THE INVENTION

During the installation of fiber optic routes, the fiber optic cables are installed in reel lengths that range, for example, from 10,000 to 16,000 feet. For extended routes, the within the cables. Once these splices are made, they are housed in a metallic enclosure for safety and security. For further protection from harsh environments, the metallic enclosure may be disposed within a high-density polyethylene (HDPE) enclosure and thereafter sealed with an encapsulant comprising a foam rubber-based solution. The encapsulant is intended to prevent water and other debris from entering the splice enclosure.

While most conventional encapsulants provide the necessary protection, it is difficult to remove this foam-based material when a particular splice needs to be repaired or replaced. A conventional approach to removing the encapsulant is to simply use a "skinning knife" to cut away the material. Such a technique is often dangerous to the person performing the repair, and may also result in damaging the optic cables within the splice (such as by accidentally cutting through all of the enclosures and inadvertently cutting one or more cables). Thus, a need remains for an improved method of removing encapsulant from a fiber optic cable.

SUMMARY OF THE INVENTION

The need remaining in the prior art is addressed by the present invention, which relates to a tool and method for removing the encapsulant surrounding a fiber optic cable and, more particularly, to a hand-held cutting tool including a pair of scissor blades for cutting away the encapsulant.

In accordance with the present invention, a hand-held cutting tool is formed to include a pair of saw-tooth-edged scissor blades, fixed together at a common pivot point within the cutting tool. The scissor action of the blades is controlled by a motor and gear housed within the cutting tool. In a preferred embodiment, a battery-operated DC motor is used. In the method of removing the encapsulant, the hand-held cutting tool is pushed into the encapsulant, removing slices of the encapsulant material as the blades move back and forth in a scissor motion.

Other and further embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
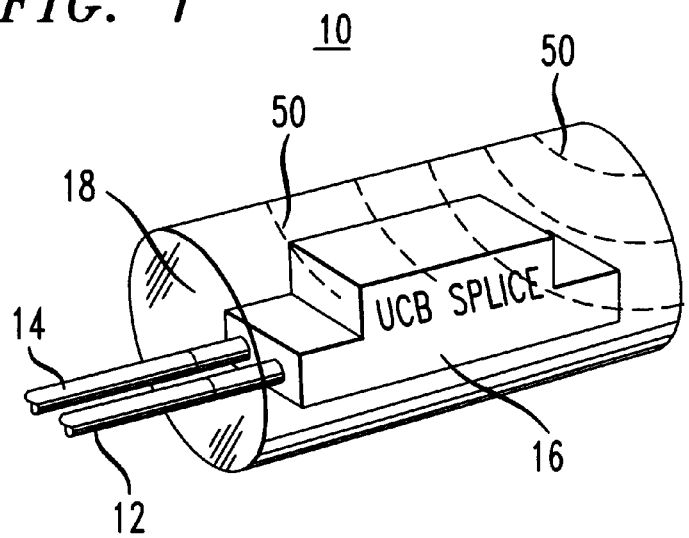
FIG. 1 illustrates an exemplary fiber optic cable splice, housed in an encapsulant material.

FIG. 1 illustrates a conventional fiber optic splice arrangement 10. As shown, arrangement 10 includes a pair of separate fiber optic cables 12 and 14, the terminations of which are spliced together within a splice housing 16. The details regarding the nature of the splicing arrangement are well-known in the art and are not considered to be relevant to an understanding of the tool and method of the present invention. As mentioned above, splice housing 16 is sealed within an encapsulant 18, where encapsulant 18 functions to prevent water and other debris from entering splice housing 16. A common material used as an encapsulant is a foam rubber-based solution, such as a parafinic hydrocarbon, that cures upon application.

When splice housing 16 needs to be accessed to repair or replace the internal splice, encapsulant 18 (or a portion thereof) must be removed. A conventional prior art technique for the removal requires the use of a "skinning" knife, a hand tool used by the repair personnel. Improper use of this tool, however, may result in cutting the person performing the repair and/or damaging the fiber cables associated with the splice housing.

Figure 2:
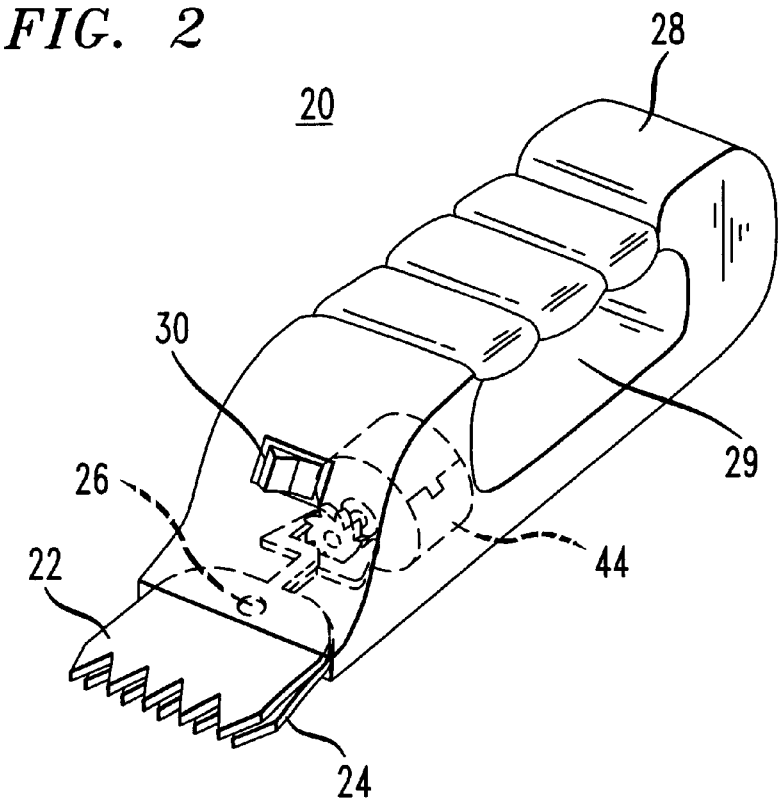
FIG. 2 illustrates an exemplary hand-held encapsulant cutting tool formed in accordance with the present invention.

FIG. 2 illustrates a hand-held, motor-driven cutting tool 20, formed in accordance with the present invention, that may be used to remove encapsulant material surrounding a fiber optic cable splice. As shown, cutting tool 20 includes a pair of saw-tooth-edged scissor blades 22 and 24 disposed to overly one another and be held together at a common pivot point 26, where in a preferred, blades 22,24 comprise steel components. Blades 22,24 are attached to a tool housing 28, where housing 28 includes an activation switch 30. Upon activation, as discussed below in association with FIG. 3, blades 22 and 24 will move in opposite directions, as indicated by the arrows shown in FIG. 2, so as to provide the necessary cutting motion. An open handle area 29 included within housing 28 is considered to be a preferred embodiment, facilitating the handling and accurate operation of tool 20 by repair personnel.

Figure 3:
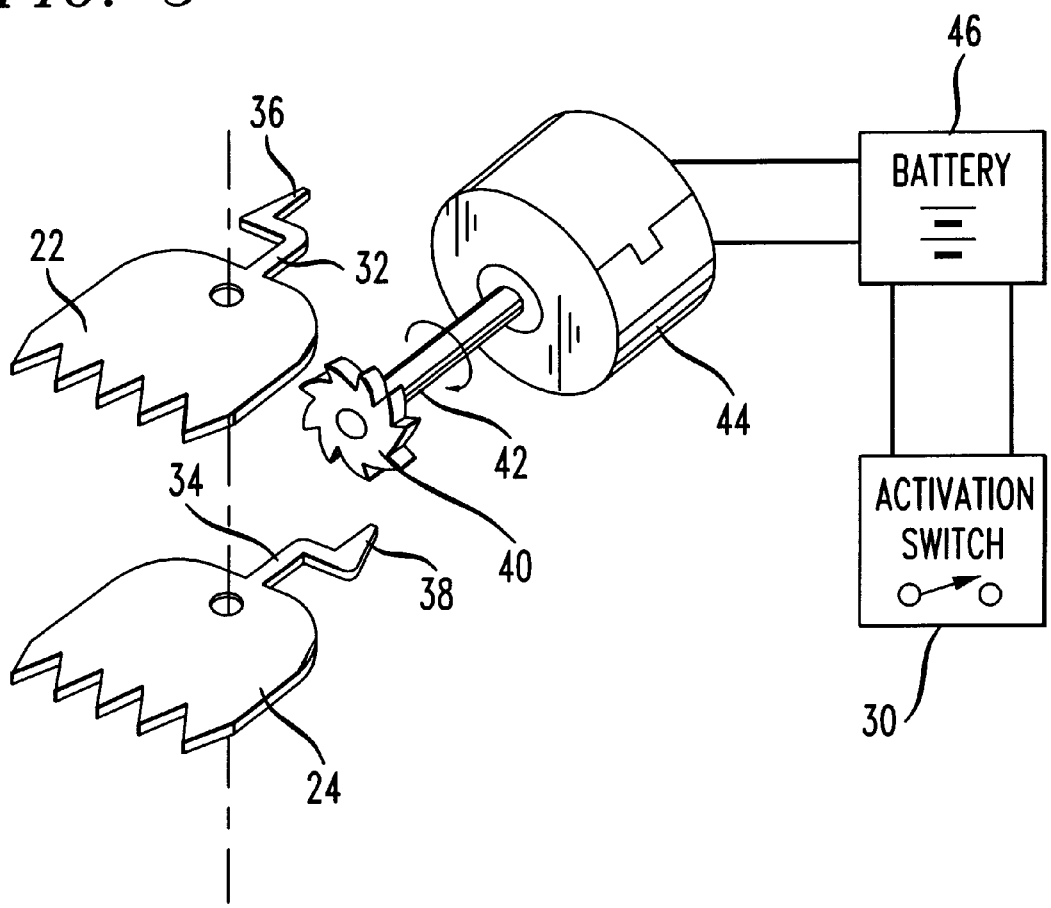
FIG. 3 contains an exploded view of a pair of scissor blades and DC motor used within the encapsulant cutting tool of FIG. 2.

Referring to FIG. 3, a preferred method of providing the required cutting motion of blades 22,24 is shown. In particular, the termination of blades 22,24 are illustrated as coupled to a pair of translation arms 32 and 34, respectively. Arms 32 and 34 are formed to include teeth terminations 36,38 that are disposed to engage a gear 40, as shown. A gear shaft 42 is used to couple gear 40 to a DC motor 44, where DC motor 44 is powered by an included battery 46. As discussed above in association with FIG. 2, the cutting operation of tool 20 is controlled by activation switch 30, where as shown in FIG. 3 switch 30 is coupled to battery 46. Therefore, once activated, motor 44 functions to rotate shaft 42 and gear 40 so that blades 22,24 move back and forth to effect the scissor action of teeth 36,38. FIG. 1 includes a series of dotted lines 50, illustrating a series of scissor cuts through encapsulant 18 that may be performed by cutting tool 20 of the present invention. In particular, cutting tool 20 is activated and pushed into an area of encapsulant 18 that is to be removed. The cutting action then removes "slices" of the encapsulant 18 until splice 16 is exposed.

Although the cutting tool described above utilizes a battery-operated motor, it is to be understood that various other arrangements for providing power to the motor may be used, including but not limited to, AC attachments to an external power supply. The battery-operated embodiment, however, is considered to be preferable for most cable splice situations, where repair personnel are "in the field" and, as such, may not be near a source of electricity. Other and further arrangements are possible and all are considered to fall within the spirit and scope of the present invention as defined by claims appended hereinbelow.

What is claimed is:

1. A cutting tool for removing encapsulant material surrounding a fiber optic cable splice, said cutting tool comprising overlapping scissor blades, each blade including a first cutting edge and an opposing connection edge, the overlapping scissor blades coupled together at their connection edges to form a pivot point;

a blade propulsion arrangement coupled to said overlapping blades for providing opposing scissor motion to said overlapping blades, said blade propulsion arrangement comprising a plurality of translation arms, each arm coupled at a first end to a separate connection edge of said overlapping blades, with a second, remaining end of each arm of said plurality of translation arms formed as a gear tooth;

a gear disposed to engage each gear tooth of the plurality of translation arms;

a gear shaft coupled to said gear;

an activation switch for turning "on" and "off" said scissor motion; and a motor, coupled between said activation switch and said gear shaft for controlling the rotation of said gear shaft, the oscillation of said gear shaft resulting in generating the scissor motion of the overlapping scissor blades.

2. A cutting tool as defined in claim 1 wherein the motor is a DC motor and the tool further comprises a battery coupled to said DC motor to control said DC motor.

3. A cutting tool as defined in claim 1 wherein the overlapping scissor blades comprise steel blades.

4. A cutting tool as defined in claim 1 wherein the cutting edges of the overlapping scissor blades comprise saw-tooth edges.

* * * * *